(12) United States Patent
Owatari et al.

(10) Patent No.: US 9,028,355 B2
(45) Date of Patent: May 12, 2015

(54) CONTROL APPARATUS FOR AUTOMATIC TRANSMISSION (71) Applicants: Masakazu Owatari, Aichi-gun (JP); Nobutada Saitou, Okazaki (JP); Shinei Takata, Anjo (JP)

(72) Inventors: Masakazu Owatari, Aichi-gun (JP); Nobutada Saitou, Okazaki (JP); Shinei Takata, Anjo (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 95 days.

(21) Appl. No.: 13/778,980

(22) Filed: Feb. 27, 2013

(65) Prior Publication Data
US 2013/0233111 A1 Sep. 12, 2013

(30) Foreign Application Priority Data
Mar. 12, 2012 (JP) ................................. 2012-054204

(51) Int. Cl.
F16H 61/00 (2006.01)
F16H 61/12 (2010.01)
F16H 61/686 (2006.01)

(52) U.S. Cl.
CPC ........... *F16H 61/00* (2013.01); *Y10T 74/20024* (2015.01); *F16H 61/12* (2013.01); *F16H 61/686* (2013.01); *F16H 2061/1252* (2013.01); *F16H 2200/006* (2013.01); *F16H 2200/2007* (2013.01); *F16H 2200/2023* (2013.01); *F16H 2200/2048* (2013.01)

(58) Field of Classification Search
None
See application file for complete search history.

(56) References Cited

U.S. PATENT DOCUMENTS

| 3,799,001 | A | * | 3/1974 | Takagi et al. | .................. 477/61 |
| 2005/0247153 | A1 | * | 11/2005 | Nozaki et al. | ............. 74/473.11 |
| 2007/0117678 | A1 | | 5/2007 | Fukushima et al. | |
| 2009/0171545 | A1 | | 7/2009 | Shimizu et al. | |

FOREIGN PATENT DOCUMENTS

JP A-2007-146901 6/2007
WO WO 2009/084294 A1 7/2009

* cited by examiner

*Primary Examiner* — Justin Holmes
*Assistant Examiner* — David Morris
(74) *Attorney, Agent, or Firm* — Oliff PLC (57) ABSTRACT A control apparatus for an automatic transmission including three frictional engagement elements is configured to set engagement pressures of first and second frictional engagement elements at the time when a predetermined shift speed is established such that a torque capacity of a third frictional engagement element becomes smaller than torque capacities of the first and second frictional engagement elements in the case where an engagement pressure is generated in the third frictional engagement element at the time when the predetermined shift speed is established.

4 Claims, 6 Drawing Sheets

|  | C1 | C2 | C3 | C4 | B1 | B2 | F1 |
|---|---|---|---|---|---|---|---|
| P |  |  |  |  |  |  |  |
| Rev |  |  | ○ |  |  | ○ |  |
| N |  |  |  |  |  |  |  |
| 1st | ○ |  |  |  |  | (○) | ○ |
| 2nd | ○ |  |  |  | ○ |  |  |
| 3rd | ○ |  | ○ |  |  |  |  |
| 4th | ○ |  |  | ○ |  |  |  |
| 5th | ○ | ○ |  |  |  |  |  |
| 6th |  | ○ |  | ○ |  |  |  |
| 7th |  | ○ | ○ |  |  |  |  |
| 8th |  | ○ |  |  |  | ○ |  |

(○) INDICATES TIME OF ENGINE BRAKING

CONTROL APPARATUS FOR AUTOMATIC TRANSMISSION

INCORPORATION BY REFERENCE

The disclosure of Japanese Patent Application No. 2012-054204 filed on Mar. 12, 2012 including the specification, drawings and abstract is incorporated herein by reference in its entirety.

BACKGROUND OF THE INVENTION

1. Field of the Invention

The invention relates to a control apparatus for an automatic transmission.

2. Description of Related Art

There is known a control apparatus for an automatic transmission that automatically changes the speed of an output from an engine and transmits the output to driving wheels (e.g., see Japanese Patent Application Publication No. 2007-146901 (JP-2007-146901 A) and WO 2009/084294).

An automatic transmission of Japanese Patent Application Publication No. 2007-146901 (JP-2007-146901 A) is equipped with a first shifting portion (a front planetary portion) that is mainly constituted of a first planetary gear train, a second shifting portion (a rear planetary portion) that is mainly constituted of a second planetary gear train and a third planetary gear train, and a plurality of frictional engagement elements (clutches and brakes). This automatic transmission establishes each shift speed by selecting and engaging two of the plurality of the frictional engagement elements. The automatic transmission changes the speed of rotation input to an input shaft at a speed ratio corresponding to each shift speed, and outputs the rotation from an output shaft.

Besides, the respective frictional engagement elements are engaged or released through an engagement pressure that is regulated by an oil pressure control device. This oil pressure control device is provided with linear solenoid valves for regulating engagement pressures of the respective frictional engagement elements, and a failsafe gear stage switching valve for establishing a low-speed failsafe gear stage or a high-speed failsafe gear stage when there is a malfunction in at least one of the linear solenoid valves. Thus, even in the case where there is a malfunction in at least one of the linear solenoid valves, the low-speed failsafe gear stage or the high-speed failsafe gear stage can be established.

Incidentally, in WO 2009/084294, there is described a control apparatus for an automatic transmission. In this control apparatus, in the case where, with two frictional engagement elements engaged, another frictional engagement element is engaged on the basis of a line pressure, an engagement pressure is set such that one of these three frictional engagement elements slips, whereby a cutoff valve is omitted. Incidentally, a cutoff valve is designed to prevent the three frictional engagement elements from being simultaneously engaged. When an engagement pressure of that one of the frictional engagement elements which is engaged during a normal state is input to the cutoff valve, the cutoff valve serves to shut off oil pressures applied to the other frictional engagement elements.

SUMMARY OF THE INVENTION

In the control apparatus for the automatic transmission according to the related art disclosed in Japanese Patent Application Publication No. 2007-146901 (JP 2007-146901 A), the failsafe gear stage switching valve needs to be provided. Therefore, it is difficult to reduce the number of parts. In WO 2009/084294, in the case where one of the three frictional engagement elements is caused to slip with a certain balance maintained among the torque capacities of the respective frictional engagement elements, a deceleration force may be generated due to a downshift when another one of the frictional engagement elements is engaged on the basis of a line pressure.

The invention provides a control apparatus for an automatic transmission that can suppress the occurrence of a downshift while reducing the number of parts.

A first aspect of the invention relates to a control apparatus for an automatic transmission. The automatic transmission is provided with a first frictional engagement element, a second frictional engagement element, and a third frictional engagement element. The automatic transmission is configured to establish a first shift speed by engagement of the first frictional engagement element and the second frictional engagement element. The automatic transmission is configured to establish a second shift speed having a larger speed ratio than a speed ratio of the first shift speed, by engagement of the first frictional engagement element and the third frictional engagement element. The control apparatus includes a controller configured to set an engagement pressure of the first frictional engagement element at a time when the first shift speed is established and an engagement pressure of the second frictional engagement element at the time when the first shift speed is established such that a torque capacity of the third frictional engagement element becomes smaller than a torque capacity of the first frictional engagement element and a torque capacity of the second frictional engagement element, in a case where an engagement pressure is generated in the third frictional engagement element at the time when the first shift speed is established. Incidentally, the case where an engagement pressure is generated in the third frictional engagement element at the time of formation of the first shift speed (i.e., the time when the first shift speed is established) is, for example, a case where an engagement pressure (e.g., a line pressure) is generated in the third frictional engagement element due to a malfunction in an electromagnetic valve (a linear solenoid valve) that supplies the third frictional engagement element with an engagement pressure.

Owing to this configuration, in the case where an engagement pressure is generated in the third frictional engagement element at the time of formation of the first shift speed (i.e., the time when the first shift speed is established), the first shift speed is maintained due to slippage of the third frictional engagement element. Therefore, the occurrence of a downshift can be suppressed. Besides, the first shift speed can be maintained without providing a failsafe valve, due to slippage of the third frictional engagement element. Therefore, the number of parts can be reduced.

Besides, a second aspect of the invention relates to a control apparatus for an automatic transmission. The automatic transmission is provided with a fourth frictional engagement element, a fifth frictional engagement element, and a sixth frictional engagement element. The automatic transmission is configured to establish a third shift speed by engagement of the fourth frictional engagement element and the fifth frictional engagement element. The automatic transmission is configured to establish a fourth shift speed having a smaller speed ratio than a speed ratio of the third shift speed, by engagement of the fourth frictional engagement element and the sixth frictional engagement element. The control apparatus includes a controller configured to set an engagement pressure of the fourth frictional engagement element at a time when the third shift speed is established and an engagement pressure of the fifth frictional engagement element at the time when the third shift speed is established such that a torque capacity of the fifth frictional engagement element becomes smaller than a torque capacity of the fourth frictional engagement element and a torque capacity of the sixth frictional engagement element, in a case where an engagement pressure is generated in the sixth frictional engagement element at the time when the third shift speed is established. Incidentally, the case where an engagement pressure is generated in the sixth frictional engagement element at the time of formation of the third shift speed (i.e., the time when the third shift speed is established) is, for example, a case where an engagement pressure (e.g., a line pressure) is generated in the sixth frictional engagement element due to a malfunction in an electromagnetic valve (a linear solenoid valve) that supplies the sixth frictional engagement element with an engagement pressure.

Owing to this configuration, in the case where an engagement pressure is generated in the sixth frictional engagement element at the time when the third shift speed is established, an upshift to the fourth shift speed is made due to slippage of the fifth frictional engagement element. Therefore, the occurrence of a downshift can be suppressed. Besides, the fourth shift speed can be established without providing a failsafe valve, due to slippage of the fifth frictional engagement element. Therefore, the number of parts can be reduced.

In the control apparatus of each of the foregoing first and second aspects of the invention, each of the frictional engagement elements may be supplied with an engagement pressure that is obtained by regulating a line pressure, and the line pressure may be set higher than an oil pressure that is able to satisfy a torque capacity required of each of the frictional engagement elements.

Owing to this configuration, the balance of the torque capacities of the respective frictional engagement elements can be changed by enhancing the line pressure. Therefore, one of the three frictional engagement elements can be set as a slipping frictional engagement element.

The control apparatus for the automatic transmission according to the invention makes it possible to suppress the occurrence of a downshift while reducing the number of parts.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

One embodiment of the invention will be described hereinafter on the basis of the drawings.

Figure 1:
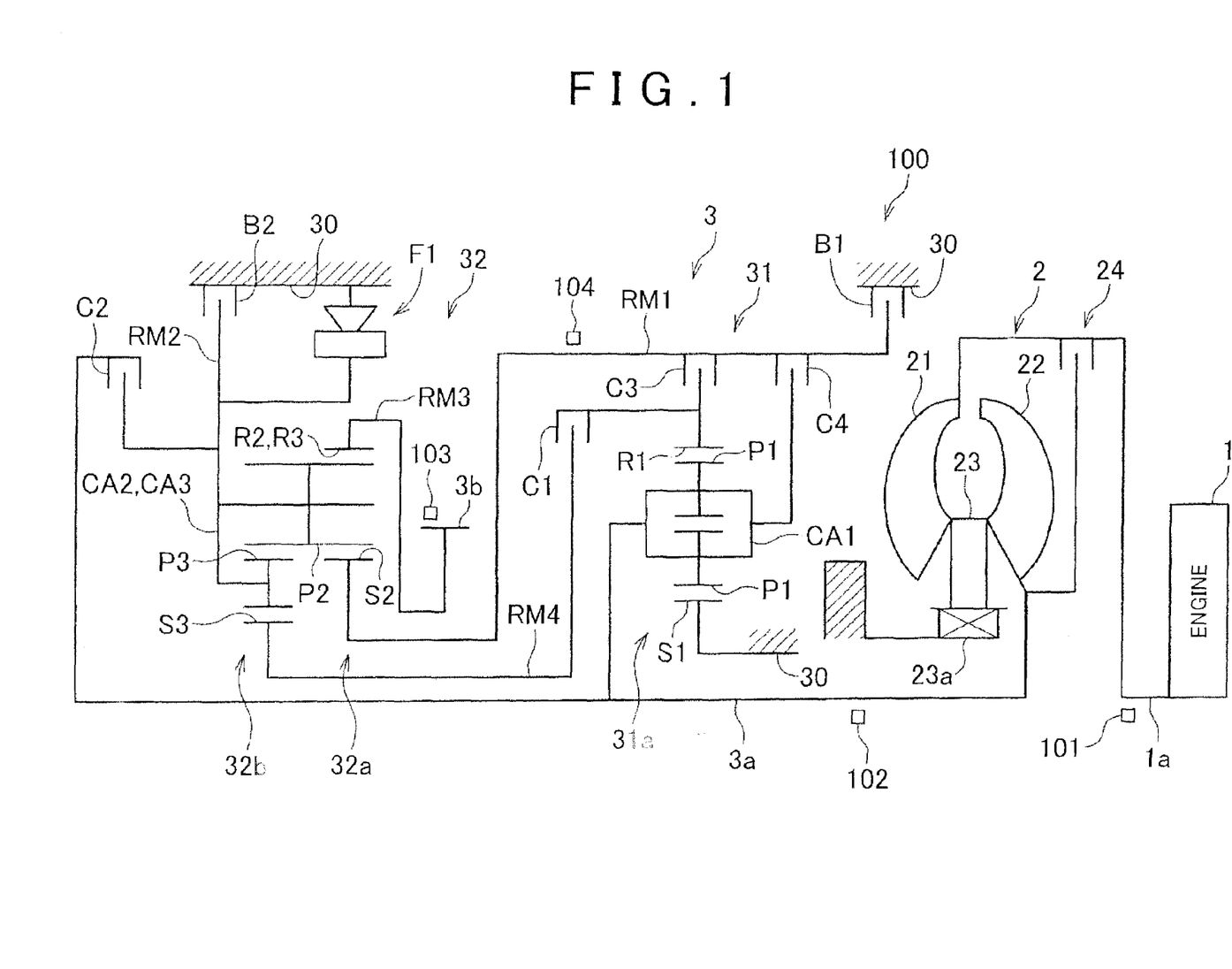
FIG. 1 is a skeleton diagram showing an overall configuration of a vehicle that is equipped with a control apparatus for an automatic transmission according to one embodiment of the invention.

First of all, a vehicle 100 that is equipped with a control apparatus 10 (see FIG. 4) for an automatic transmission according to the embodiment of the invention will be described with reference to FIG. 1.

The vehicle 100 is, for example, a front-engine front-drive (FF) vehicle, and front-right and front-left wheels (driving wheels) thereof are driven. As shown in FIG. 1, this vehicle 100 is equipped with an engine 1, a torque converter 2, an automatic transmission 3, an ECU 4, and an oil pressure control circuit 5 (see FIG. 4). Incidentally, FIG. 1 schematically shows only an upper half of the vehicle 100 with respect to a rotational center shaft of the automatic transmission 3, with a lower half of the vehicle 100 omitted.

—Engine—

An engine (an internal combustion engine) 1 is a known motive power unit that burns fuel to output motive power, such as a gasoline engine, a diesel engine, or the like. The engine 1 is configured to be capable of controlling operation states, for example, the throttle opening degree (the intake air amount) of a throttle valve that is provided in an intake passage, the amount of fuel injection, the ignition timing and the like. An output of the engine 1 is transmitted to a torque converter 2 via a crankshaft 1$a$. Incidentally, a rotational speed of the crankshaft 1$a$ is detected by a crank position sensor 101, and an output signal of the crank position sensor 101 is input to the ECU 4.

—Torque Converter—

The torque converter 2 has a function of increasing a torque input from the engine 1 and outputting the increased torque to the automatic transmission 3. This torque converter 2 includes a pump impeller 21 that is coupled to the crankshaft 1$a$, a turbine liner 22 that is coupled to the automatic transmission 3, a stator 23 for increasing a torque, and a lockup mechanism 24 for directly coupling the engine 1 and the automatic transmission 3 to each other.

When being rotated, the pump impeller 21 delivers a fluid (oil) to the turbine liner 22. The turbine liner 22 is then rotated by the fluid delivered from the pump impeller 21. In the case where there is a large difference between the rotational speed of the pump impeller 21 and the rotational speed of the turbine liner 22, the stator 23 rectifies the fluid returned from the turbine liner 22 to the pump impeller 21, and assists rotation of the pump impeller 21 with the aid of the rectified fluid. Incidentally, the stator 23 is configured to rotate together with the turbine liner 22 through a one-way clutch 23$a$, in the case where the difference between the rotational speed of the pump impeller 21 and the rotational speed of the turbine liner 22 has become small.

—Automatic Transmission—

The automatic transmission 3 is provided in a motive power transmission path between the engine 1 and the driving wheels (not shown). The automatic transmission 3 changes the speed of a rotational motive power that is input from the engine 1 to an input shaft 3$a$ via the torque converter 2, and outputs the rotational motive power to an output shaft 3$b$. In the automatic transmission 3, the input shaft 3a is coupled to the turbine liner 22 of the torque converter 2, and the output shaft 3b is coupled to the driving wheels via a differential device or the like.

Incidentally, a rotational speed of the input shaft 3a of the automatic transmission 3 is detected by an input shaft rotational speed sensor 102. Besides, a rotational speed of the output shaft 3b of the automatic transmission 3 is detected by an output shaft rotational speed sensor 103. Respective output signals of these sensors, namely, the input shaft rotational speed sensor 102 and the output shaft rotational speed sensor 103 are input to the ECU 4.

The automatic transmission 3 is constituted of a first shifting portion (a front planetary portion) 31 that is mainly constituted of a first planetary gear train 31a, a second shifting portion (a rear planetary portion) 32 that is mainly constituted of a second planetary gear train 32a and a third planetary gear train 32b, first to fourth clutches C1 to C4, a first brake B1, a second brake B2, a one-way clutch F1, and the like.

The first planetary gear train 31a constituting the first shifting portion 31 is a double pinion-type planetary gear mechanism, and is equipped with a sun gear S1, a plurality of pairs of pinion gears P1 that mesh with one another, a planetary carrier CA1 that supports these pinion gears P1 such that each of the pinion gears P1 can rotate around its own axis and around an axis of the planetary carrier CA1, and a ring gear R1 that meshes with the sun gear S1 via the pinion gears P1.

The planetary carrier CA1 is coupled to the input shaft 3a, and can be rotationally driven integrally with the input shaft 3a. The sun gear S1 is integrally fixed to a transmission case 30 in an unrotatable manner. The ring gear R1 functions as an intermediate output member, is rotated in a decelerating manner with respect to the input shaft 3a, and transmits its rotation to the second shifting portion 32.

The second planetary gear train 32a constituting the second shifting portion 32 is a single pinion-type planetary gear mechanism, and is equipped with a sun gear S2, a pinion gear P2, a planetary carrier CA2 that supports the pinion gear P2 such that the pinion gear P2 can rotate around its own axis and around an axis of the planetary carrier CA2, and a ring gear R2 that meshes with the sun gear S2 via the pinion gear P2.

Besides, the third planetary gear train 32b constituting the second shifting portion 32 is a double pinion-type planetary gear mechanism, and is equipped with a sun gear S3, a plurality of pairs of pinion gears P2 and P3 that mesh with one another, a planetary carrier CA3 that supports the pinion gears P2 and P3 such that each of the pinion gears P2 and P3 can rotate around its own axis and around an axis of the planetary carrier CA3, and a ring gear R3 that meshes with the sun gear S3 via the pinion gears P2 and P3.

In addition, in the second planetary gear train 32a and the third planetary gear train 32b, the planetary carriers CA2 and CA3 that rotatably support the pinion gear P2 are shared by each other, and the ring gears R2 and R3 are shared by each other. In addition, in the second planetary gear train 32a and the third planetary gear train 32b, four rotary elements RM1 to RM4 are formed. That is, the sun gear S2 of the second planetary gear train 32a constitutes the first rotary element RM1, and the planetary carrier CA2 of the second planetary gear train 32a and the planetary carrier CA3 of the third planetary gear train 32b are integrally coupled to each other to constitute the second rotary element RM2. Furthermore, the ring gear R2 of the second planetary gear train 32a and the ring gear R3 of the third planetary gear train 32b are integrally coupled to each other to constitute the third rotary element RM3, and the sun gear S3 of the third planetary gear train 32b constitutes the fourth rotary element RM4.

The sun gear S2 as the first rotary element RM1 is selectively coupled to the transmission case 30 via the first brake B1. When the first brake B1 is engaged, the sun gear S2 is stopped from rotating. When the first brake B1 is released, the sun gear S2 can rotate.

Besides, the sun gear S2 is selectively coupled to the ring gear R1 of the first planetary gear train 31a as an intermediate output member via the third clutch C3. When the third clutch C3 is engaged, the sun gear S2 and the ring gear R1 integrally rotate. When the third clutch C3 is released, the sun gear S2 and the ring gear R1 can rotate relatively to each other.

Furthermore, the sun gear S2 is selectively coupled to the planetary carrier CA1 of the first planetary gear train 31a via the fourth clutch C4. When the fourth clutch C4 is engaged, the sun gear S2 and the planetary carrier CA1 integrally rotate. When the fourth clutch C4 is released, the sun gear S2 and the planetary carrier CA1 can rotate relatively to each other.

It should be noted herein that a rotational speed of the first rotary element RM1 is detected by an intermediate shaft rotational speed sensor 104, and that an output signal of the intermediate shaft rotational speed sensor 104 is input to the ECU 4.

The planetary carriers CA2 and CA3 as the second rotary element RM2 are selectively coupled to the transmission case 30 via the second brake B2. When the second brake B2 is engaged, the planetary carriers CA2 and CA3 are stopped from rotating. When the second brake B2 is released, the planetary carriers CA2 and CA3 can rotate.

Besides, the planetary carriers CA2 and CA3 are selectively coupled to the input shaft 3a via the second clutch C2. When the second clutch C2 is engaged, the planetary carriers CA2 and CA3 rotate integrally with the input shaft 3a. When the second clutch C2 is released, the planetary carriers CA2 and CA3 can rotate relatively to the input shaft 3a.

Furthermore, the planetary carriers CA2 and CA3 are coupled to the transmission case 30 via the one-way clutch F1. The planetary carriers CA2 and CA3 are regulated in such a manner as to rotate only in one direction.

The ring gears R2 and R3 as the third rotary element RM3 are integrally rotatably coupled to the output shaft 3b. In addition, the sun gear S3 as the fourth rotary element RM4 is selectively coupled to the ring gear R1 via the first clutch C1. When the first clutch C1 is engaged, the sun gear S3 rotates integrally with the ring gear R1. When the first clutch C1 is released, the sun gear S3 and the ring gear R1 can rotate relatively to each other.

Each of the first to fourth clutches C1 to C4 and the first and second brakes B1 and B2 as mentioned above is a wet multi-plate frictional engagement device (a frictional engagement element) that is frictionally engaged by a hydraulic actuator (a hydraulic cylinder). The engagement or release of these first to fourth clutches C1 to C4 and these first and second brakes B1 and B2 is controlled by the control apparatus 10 (see FIG. 4) for the automatic transmission.

Figure 2:
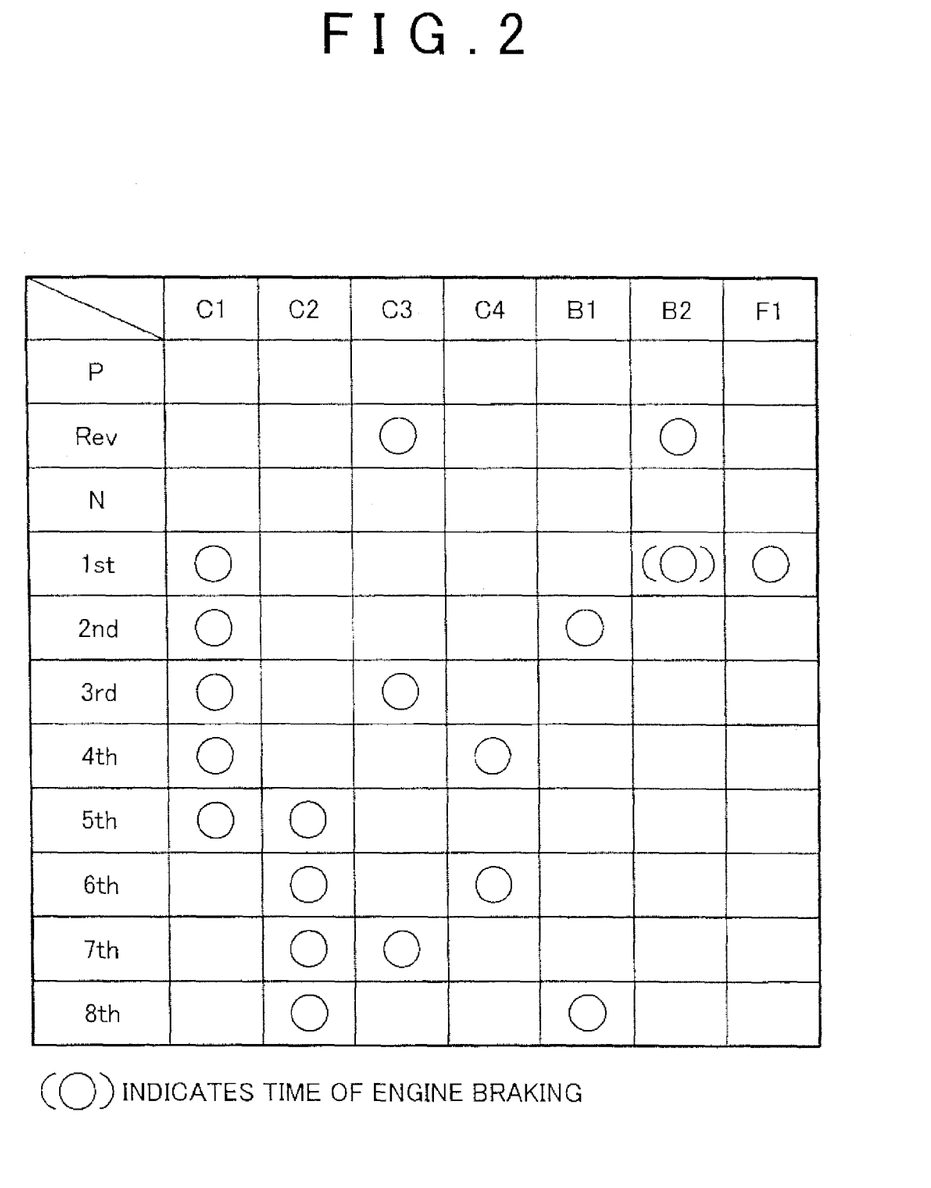
FIG. 2 is an engagement table showing engagement states of first to fourth clutches and first and second brakes for each shift speed in the automatic transmission of FIG. 1.
Figure 3:
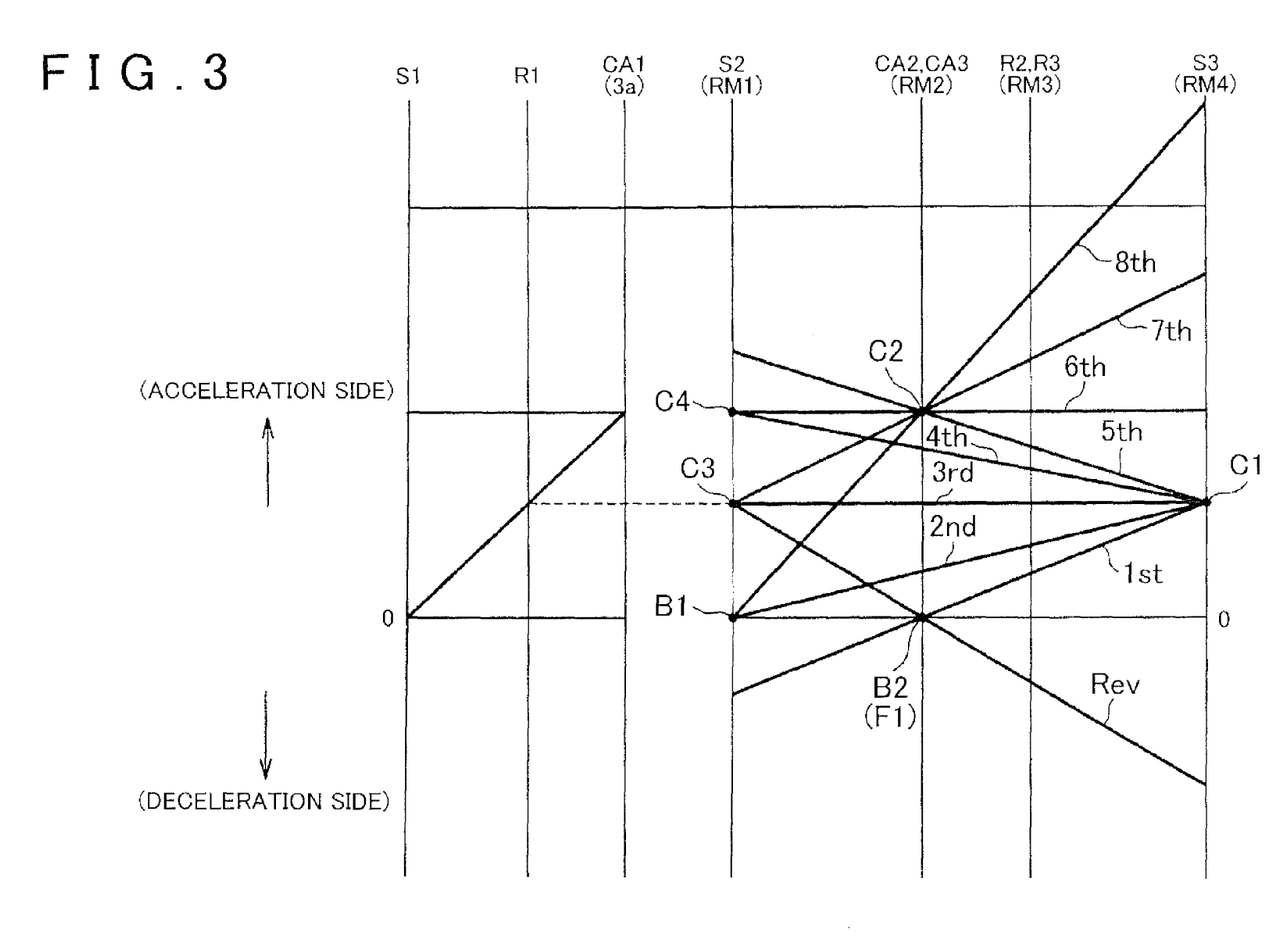
FIG. 3 is a collinear diagram showing rotational speed ratios of first to fourth rotary elements for each shift speed in the automatic transmission of FIG. 1.

FIG. 2 is an engagement table showing engaged states or released states of the first to fourth clutches C1 to C4 and the first and second brakes B1 and B2 for each shift speed (gear stage). FIG. 3 is a collinear diagram showing rotational speed ratios of the first to fourth rotary elements RM1 to RM4 for each shift speed. Incidentally, in the engagement table of FIG. 2, each mark "O" indicates "an engaged state", and each blank indicates "a released state".

As shown in FIGS. 2 and 3, in the automatic transmission 3 of this example, the first clutch C1 and the one-way clutch F1 are engaged to establish a first (1st) speed with the largest speed ratio (the speed ratio=the rotational speed of the input shaft $3a$/the rotational speed of the output shaft $3b$). Incidentally, at the time of engine braking, the second brake B2 is engaged. The first clutch C1 and the first brake B1 are engaged to establish a second (2nd) speed.

The first clutch C1 and the third clutch C3 are engaged to establish a third (3rd) speed. The first clutch C1 and the fourth clutch C4 are engaged to establish a fourth (4th) speed. The first clutch C1 and the second clutch C2 are engaged to establish a fifth (5th) speed. The second clutch C2 and the fourth clutch C4 are engaged to establish a sixth (6th) speed. In addition, the second clutch C2 and the third clutch C3 are engaged to establish a seventh (7th) speed. The second clutch C2 and the first brake B1 are engaged to establish an eighth (8th) speed.

That is, at the time of "a drive range", one of the first to eighth speeds is established. Besides, at the time of "a reverse range", the third clutch C3 and the second brake B2 are engaged to establish a reverse stage (Rev). Besides, the first to fourth clutches C1 to C4 and the first and second brakes B1 and B2 are all released to establish "a neutral range" and "a parking range" in which the transmission of motive power is suspended. Incidentally, in "the parking range", for example, rotation of the output shaft $3b$ is mechanically fixed by a parking lock mechanism (not shown).

—ECU—

Figure 4:
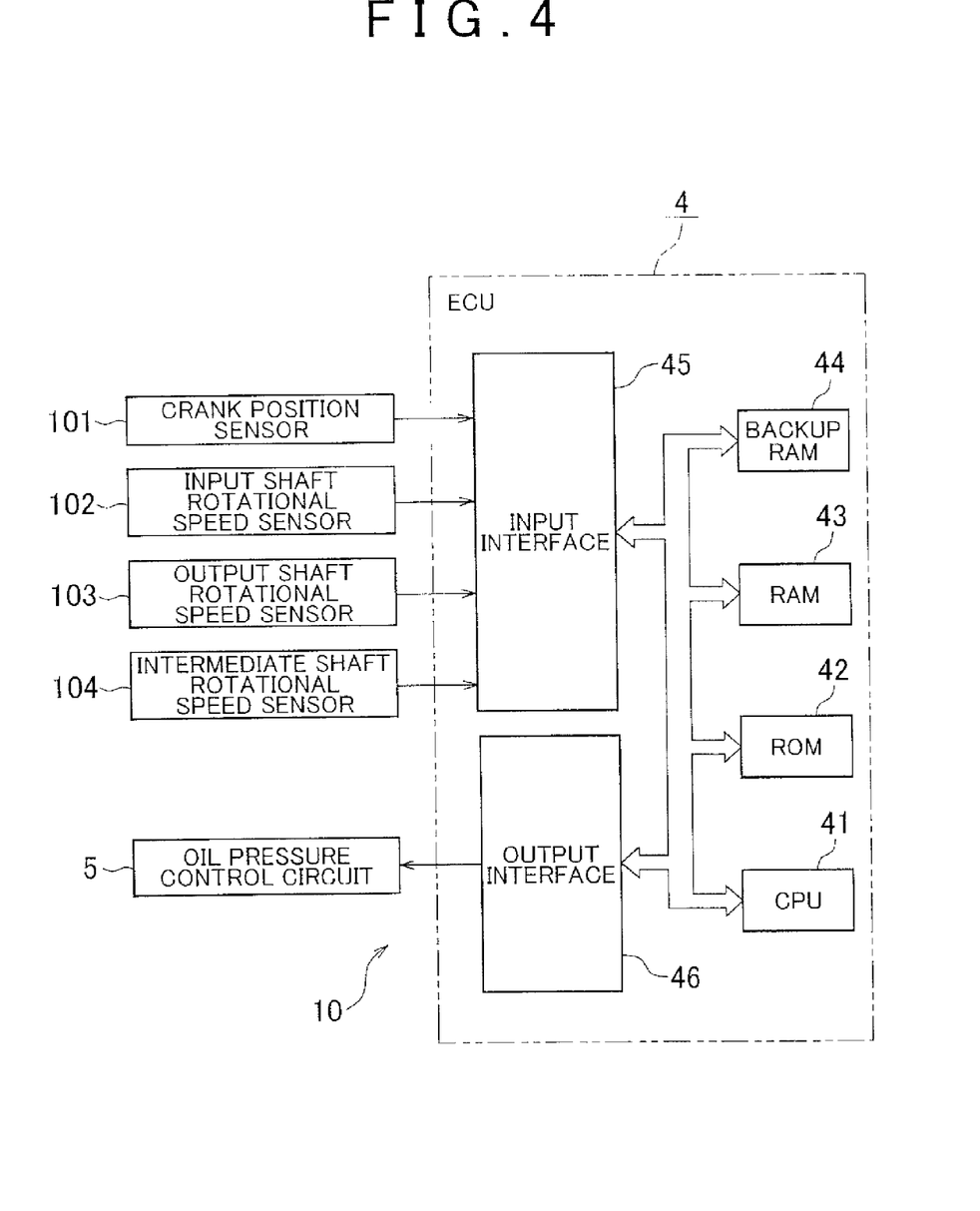
FIG. 4 is a block diagram showing an ECU that controls the vehicle of FIG. 1.

An electronic control unit (an ECU) 4 is configured to perform operation control of the engine 1, shifting control of the automatic transmission 3, and the like. More specifically, as shown in FIG. 4, the ECU 4 includes a central processing unit (a CPU) 41, a read only memory (a ROM) 42, a random access memory (a RAM) 43, a backup RAM 44, an input interface 45, and an output interface 46.

The CPU 41 performs a calculation processing on the basis of various control programs and maps that are stored in the ROM 42. The various control programs, the maps that are referred to in executing the various control programs, and the like are stored in the ROM 42. The RAM 43 is a memory that temporarily stores a calculation result of the CPU 41, detection results of the respective sensors, and the like. The backup RAM 44 is a non-volatile memory that stores data and the like to be saved in turning off an ignition switch.

The crank position sensor 101, the input shaft rotational speed sensor 102, the output shaft rotational speed sensor 103, the intermediate shaft rotational speed sensor 104, and the like are connected to the input interface 45. The oil pressure control circuit 5 and the like are connected to the output interface 46.

—Oil Pressure Control Circuit—

The oil pressure control circuit 5 is provided to control the states (engaged states or released states) of the first to fourth clutches C1 to C4 and the first and second brakes B1 and B2. Incidentally, the oil pressure control circuit 5 also has a function of controlling the lockup mechanism 24 of the torque converter 2. Besides, the ECU 4 and the oil pressure control circuit 5 constitute the control apparatus 10 for the automatic transmission (or a controller included in the control apparatus).

Figure 5:
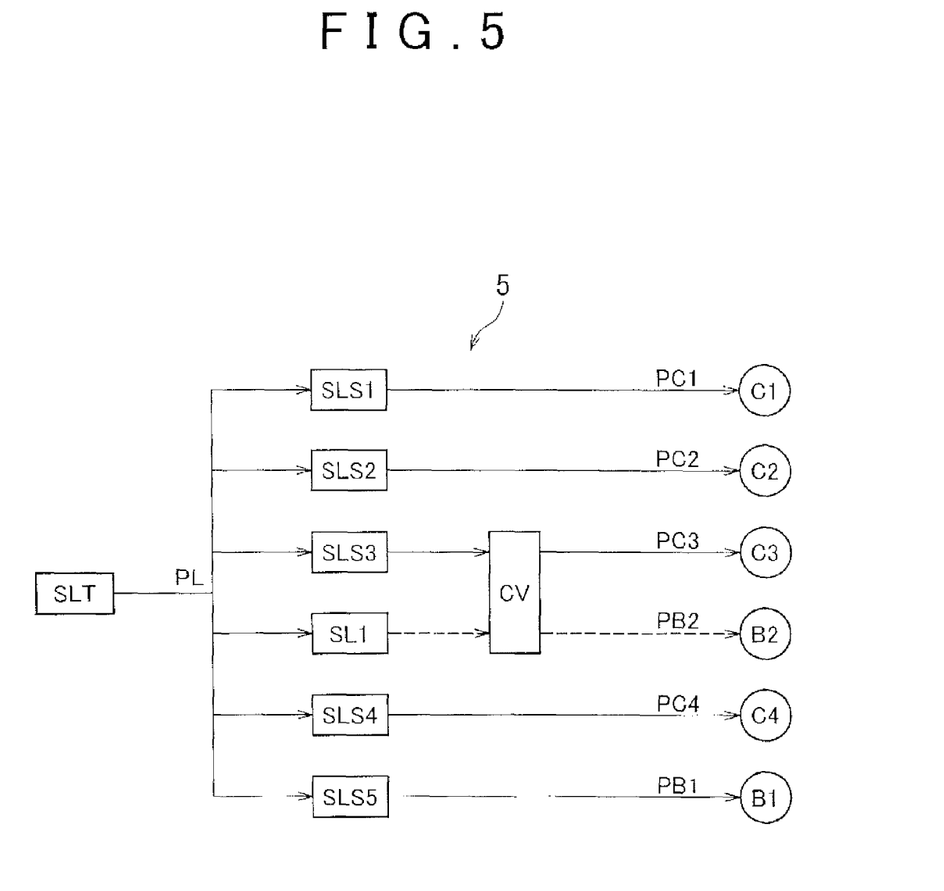
FIG. 5 is a view showing an oil pressure control circuit of FIG. 4.

More specifically, as shown in FIG. 5, the oil pressure control circuit 5 includes a linear solenoid valve SLT that outputs a line pressure PL, linear solenoid valves SLS1 to SLS5, and an on-off solenoid valve SL1. The linear solenoid valves SLS1 to SLS5 and the on-off solenoid valve SL1 are supplied with the line pressure PL.

The linear solenoid valve SLS1 regulates the line pressure PL and supplies the first clutch C1 with an engagement pressure PC1. The linear solenoid valve SLS2 regulates the line pressure PL and supplies the second clutch C2 with an engagement pressure C2. The linear solenoid valve SLS3 regulates the line pressure PL and supplies the third clutch C3 with an engagement pressure PC3. The linear solenoid valve SLS4 regulates the line pressure PL and supplies the fourth clutch C4 with an engagement pressure PC4.

The linear solenoid valve SLS5 regulates the line pressure PL and supplies the first brake B1 with an engagement pressure PB1. When the on-off solenoid valve SL1 is on, it supplies a control valve CV with the line pressure PL. At this time, the second brake B2 is supplied with an engagement pressure PB2 from the linear solenoid valve SLS3.

It should be noted herein that the line pressure PL is set higher than an oil pressure (an optimal pressure) PLz that can satisfy torque capacities required of the first to fourth clutches C1 to C4 and the first and second brakes B1 and B2 (hereinafter referred to also as "frictional engagement elements"). Thus, the balance of the torque capacities of the respective frictional engagement elements is changed. Incidentally, the torque capacity means the capacity of a torque that can be transmitted without causing each of the frictional engagement elements to slip.

—First Clutch, Third Clutch, and First Brake—

Figure 6:
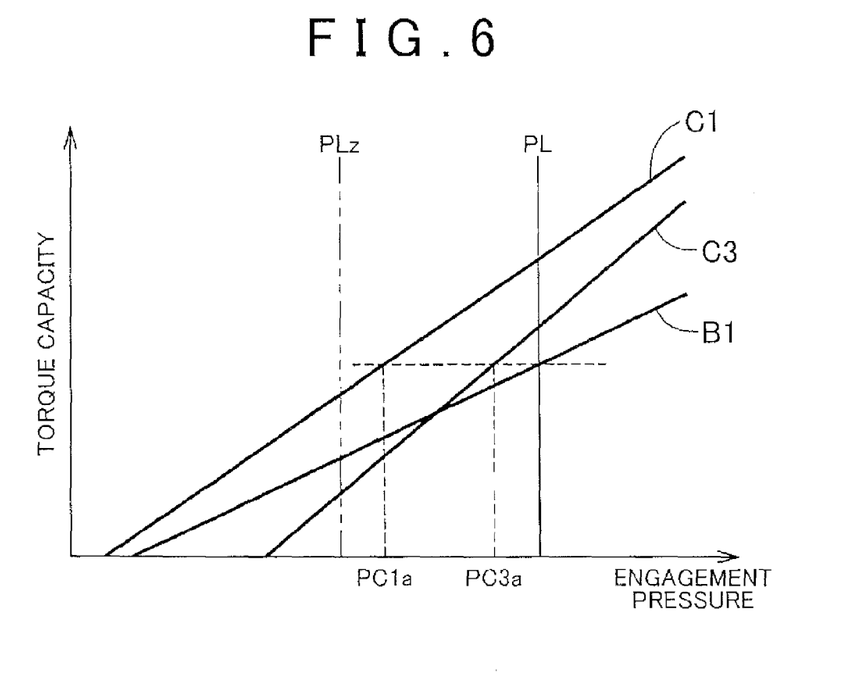
FIG. 6 is a graph showing a relationship between an engagement pressure and a torque capacity of each of the first clutch, the third clutch, and the first brake of the automatic transmission of FIG. 1.

More specifically, a relationship among the torque capacities of the first clutch C1, the third clutch C3, and the first brake B1 is shown in FIG. 6. FIG. 6 is a graph showing a relationship between engagement pressures and torque capacities of the first clutch C1, the third clutch C3, and the first brake B1. Incidentally, in the graph of FIG. 6, the axis of abscissa represents engagement pressure, and the axis of ordinate represents torque capacity.

That is, when the engagement pressure of each of the frictional engagement elements is equal to the optimal pressure PLz, the torque capacity of the first clutch C1 is larger than the torque capacity of the first brake B1, and the torque capacity of the first brake B1 is larger than the torque capacity of the third clutch C3. However, when the engagement pressure of each of the frictional engagement elements is equal to the line pressure PL, which is higher than the optimal pressure PLz, the torque capacity of the first clutch C1 is larger than the torque capacity of the third clutch C3, and the torque capacity of the third clutch C3 is larger than the torque capacity of the first brake B1.

Thus, in the case where the first brake B1 on-fails when the first clutch C1 and the third clutch C3 are engaged to establish the third speed, the third speed is maintained, and in the case where the third clutch C3 on-fails when the first clutch C1 and the first brake B1 are engaged to establish the second speed, an upshift to the third speed is made. These cases will be described hereinafter in detail. Incidentally, the term "on-fail" means, for example, that the line pressure PL is directly supplied to each of the frictional engagement elements without being regulated due to a malfunction in a corresponding one of the linear solenoid valves.

[First Brake on-Fails at Third Speed]

First of all, a case where the first brake B1 on-fails when the third speed is established will be described with reference to FIGS. 2 and 6. Incidentally, in this case, the first clutch C1 is an example of "the first frictional engagement element" of the invention, the third clutch C3 is an example of "the second frictional engagement element" of the invention, and the first brake B1 is an example of "the third frictional engagement element" of the first brake B1. Besides, the third speed is an example of "the first shift speed" of the invention, and the second speed that has a larger speed ratio than the third speed is an example of "the second shift speed" of the invention.

When the third speed is established, the first clutch C1 and the third clutch C3 are engaged. At this time, the engagement pressure PC1 of the first clutch C1 is made higher than an engagement pressure PC1a, and the engagement pressure PC3 of the third clutch C3 is made higher than an engagement pressure PC3a. That is, the torque capacities of the first clutch C1 and the third clutch C3 are made larger than a torque capacity at the time when the first brake B1 is supplied with the line pressure PL.

Then, in the case where the first brake B1 is directly supplied with the line pressure PL as the engagement pressure PB1 due to a malfunction in the linear solenoid valve SLS5 at the time when the third speed is established, the first brake B1 slips with the first clutch C1 and the third clutch C3 engaged, because the torque capacity of the first brake B1 is smaller than the torque capacities of the first clutch C1 and the third clutch C3. That is, in the case where the first brake B1 on-fails at the time when the third speed is established, the third speed is maintained.

Incidentally, in the case of the related art in which the line pressure is equal to the optimal pressure PLz, if the first brake B1 on-fails at the time when the third speed is established, the third clutch C3 slips with the first clutch C1 and the first brake B1 engaged, because the torque capacity of the first brake B1 is larger than the torque capacity of the third clutch C3. Therefore, a downshift to the second speed is made.

That is, in this embodiment of the invention, the line pressure PL is made higher than the optimal pressure PLz, whereby the third speed can be maintained in the case where the first brake B1 on-fails at the time when the third speed is established. Therefore, the occurrence of a downshift can be suppressed. Besides, since the occurrence of a downshift can be suppressed without providing a failsafe valve (a cutoff valve), the number of parts can be reduced.

[Third Clutch on-Fails at Second Speed]

Next, a case where the third clutch C3 on-fails when the second speed is established will be described with reference to FIGS. 2 and 6. Incidentally, in this case, the first clutch C1 is an example of "the fourth frictional engagement element" of the invention, the first brake B1 is an example of "the fifth frictional engagement element", and the third clutch C3 is an example of "the sixth frictional engagement element" of the invention. Besides, the second speed is an example of "the third shift speed" of the invention, and the third speed that has a smaller speed ratio than the second speed is an example of "the fourth shift speed" of the invention.

When the second speed is established, the first clutch C1 and the first brake B1 are engaged. At this time, the engagement pressure PC1 of the first clutch C1 and the engagement pressure PB1 of the first brake B1 are set such that the torque capacity of the first clutch C1 becomes larger than the torque capacity of the first brake B1. Incidentally, the torque capacity at the time when the third clutch C3 is supplied with the line pressure PL is larger than the torque capacity of the first brake B1.

Then, in the case where the third clutch C3 is directly supplied with the line pressure PL as the engagement pressure PC3 due to a malfunction in the linear solenoid valve SLS3 at the time when the second speed is established, the first brake B1 slips with the first clutch C1 and the third clutch C3 engaged, because the torque capacity of the first brake B1 is smaller than the torque capacities of the first clutch C1 and the third clutch C1 That is, in the case where the third clutch C3 on-fails at the time when the second speed is established, an upshift to the third speed is made.

Incidentally, in the case of the related art in which the line pressure is equal to the optimal pressure PLz, if the third clutch C3 on-fails at the time when the second speed is established, the third clutch C3 slips with the first clutch C1 and the first brake B1 engaged, because the torque capacity of the first brake B1 is larger than the torque capacity of the third clutch C3. Therefore, the second speed is maintained.

That is, in this embodiment of the invention, the line pressure PL is made higher than the optimal pressure PLz, whereby an upshift to the third speed can be made in the case where the third clutch C3 on-fails at the time when the second speed is established. Therefore, a malfunction can be safely detected while suppressing the generation of a deceleration force.

—First to Third Clutches—

Figure 7:
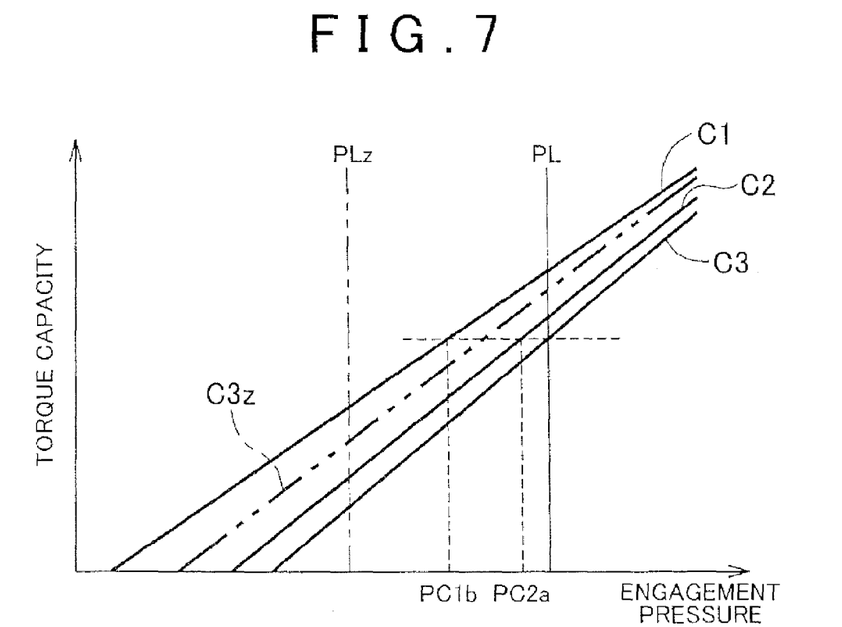
FIG. 7 is a graph showing a relationship between an engagement pressure and a torque capacity of each of the first to third clutches of the automatic transmission of FIG. 1.

Besides, a relationship among the torque capacities of the first to third clutches C1 to C3 is shown in FIG. 7. FIG. 7 is a graph showing a relationship between engagement pressures and torque capacities of the first to third clutches C1 to C3. Incidentally, in the graph of FIG. 7, the axis of abscissa represents engagement pressure, and the axis of ordinate represents torque capacity.

In this embodiment of the invention, the torque capacity for the engagement pressure of the third clutch C3 is made smaller than the torque capacity for the engagement pressure of the third clutch C3z according to the related art. Thus, the torque capacity for the engagement pressure of the third clutch C3 is made smaller than the torque capacity for the engagement pressure of the second clutch C2.

Thus, in the case where the third clutch C3 on-fails when the first clutch C1 and the second clutch C2 are engaged to establish the fifth speed, the fifth speed is maintained, and in the case where the second clutch C2 on-fails when the first clutch C1 and the third clutch C3 are engaged to establish the third speed, an upshift to the fifth speed is made. Incidentally, in the case where the first clutch C1 on-fails when the second clutch C2 and the third clutch C3 are engaged to establish the seventh speed, a downshift to the fifth speed is made. These cases will be described hereinafter in detail.

[Third Clutch on-Fails at Fifth Speed]

First of all, a case where the third clutch C3 on-fails when the fifth speed is established will be described with reference to FIGS. 2 to 7. Incidentally, in this case, the first clutch C1 is an example of "the first frictional engagement element" of the invention, the second clutch C2 is an example of "the second frictional engagement element" of the invention, and the third clutch C3 is an example of "the third frictional engagement element" of the invention. Besides, the fifth speed is an example of "the first shift speed" of the invention, and the third speed that has a larger speed ratio than the fifth speed is an example of "the second shift speed".

When the fifth speed is established, the first clutch C1 and the second clutch C2 are engaged. At this time, the engagement pressure PC1 of the first clutch C1 is made higher than an engagement pressure PC1b, and the engagement pressure PC2 of the second clutch C2 is made higher than an engagement pressure PC2a. That is, the torque capacities of the first clutch C1 and the second clutch C2 are made larger than the torque capacity at the time when the third clutch C3 is supplied with the line pressure PL.

Then, in the case where the third clutch C3 is directly supplied with the line pressure PL as the engagement pressure PC3 due to a malfunction in the linear solenoid valve SLS3 at the time when the fifth speed is established, the third clutch C3 slips with the first clutch C1 and the second clutch C2 engaged, because the torque capacity of the third clutch C3 is smaller than the torque capacities of the first clutch C1 and the second clutch C2. That is, in the case where the third clutch C3 on-fails at the time when the fifth speed is established, the fifth speed is maintained.

Incidentally, in the case of the third clutch C3z according to the related art, if the third clutch C3z on-fails at the time when the fifth speed is established, the second clutch C2 slips with the first clutch C1 and the third clutch C3z engaged, because the torque capacity of the third clutch C3z is larger than the torque capacity of the second clutch C2. Therefore, a downshift to the third speed is made.

That is, in this embodiment of the invention, the torque capacity for the engagement pressure of the third clutch C3 is made smaller than the torque capacity for the engagement pressure of the second clutch C2, whereby the fifth speed can be maintained in the case where the third clutch C3 on-fails at the time when the fifth speed is established. Therefore, the occurrence of a downshift can be suppressed. Besides, since the occurrence of a downshift can be suppressed without providing a failsafe valve, the number of parts can be reduced.

[Second Clutch on-Fails at Third Speed]

Next, a case where the second clutch C2 on-fails when the third speed is established will be described with reference to FIGS. 2 and 7. Incidentally, in this case, the first clutch C1 is an example of "the fourth frictional engagement element" of the invention, the third clutch C3 is an example of "the fifth frictional engagement element" of the invention, and the second clutch C2 is an example of "the sixth frictional engagement element" of the invention. Besides, the third speed is an example of "the third shift speed" of the invention, and the fifth speed that has a smaller speed ratio than the third speed is an example of "the fourth shift speed" of the invention.

When the third speed is established, the first clutch C1 and the third clutch C3 are engaged. At this time, the engagement pressure PC1 of the first clutch C1 and the engagement pressure PC3 of the third clutch C3 are set such that the torque capacity of the first clutch C1 becomes larger than the torque capacity of the third clutch C3. Incidentally, the torque capacity at the time when the second clutch C2 is supplied with the line pressure PL is larger than the torque capacity of the third clutch C3.

Then, in the case where the second clutch C2 is directly supplied with the line pressure PL as the engagement pressure PC2 due to a malfunction in the linear solenoid valve SLS2 at the time when the third speed is established, the third clutch C3 slips with the first clutch C1 and the second clutch C2 engaged, because the torque capacity of the third clutch C3 is smaller than the torque capacities of the first clutch C1 and the second clutch C2. That is, in the case where the second clutch C2 on-fails at the time when the third speed is established, an upshift to the fifth speed is made.

Incidentally, in the case of the third clutch C3z according to the related art, if the second clutch C2 on-fails at the time when the third speed is established, the second clutch C2 slips with the first clutch C1 and the third clutch C3z engaged, because the torque capacity of the third clutch C3z is larger than the torque capacity of the second clutch C2. Therefore, the third speed is maintained.

That is, in this embodiment of the invention, the torque capacity for the engagement pressure of the third clutch C3 is made smaller than the torque capacity for the engagement pressure of the second clutch C2, whereby an upshift to the fifth speed can be made in the case where the second clutch C2 on-fails at the time when the third speed is established. Therefore, a malfunction can be safely detected while suppressing the generation of a deceleration force.

[First Clutch on-Fails at Seventh Speed]

Next, a case where the first clutch C1 on-fails when the seventh speed is established will be described with reference to FIGS. 2 and 7.

When the seventh speed is established, the second clutch C2 and the third clutch C3 are engaged. At this time, the engagement pressure PC2 of the second clutch C2 and the engagement pressure PC3 of the third clutch C3 are set such that the torque capacity of the second clutch C2 becomes larger than the torque capacity of the third clutch C3. Incidentally, the torque capacity at the time when the first clutch C1 is supplied with the line pressure PL is larger than the torque capacities of the second clutch C2 and the third clutch C3.

Then, in the case where the first clutch C1 is directly supplied with the line pressure PL as the engagement pressure PC1 due to a malfunction in the linear solenoid valve SLS1 at the time when the seventh speed is established, the third clutch C3 slips with the first clutch C1 and the second clutch C2 engaged, because the torque capacity of the third clutch C3 is smaller than the torque capacities of the first clutch C1 and the second clutch C2. That is, in the case where the first clutch C1 on-fails at the time when the seventh speed is established, a downshift to the fifth speed is made.

Incidentally, in the case of the third clutch C3z according to the related art, if the first clutch C1 on-fails at the time when the seventh speed is established, the second clutch C2 slips with the first clutch C1 and the third clutch C3z engaged, because the torque capacity of the third clutch C3z is larger than the torque capacity of the second clutch C2. Therefore, a downshift to the third speed is made.

That is, in this embodiment of the invention, the torque capacity for the engagement pressure of the third clutch C3 is made smaller than the torque capacity for the engagement pressure of the second clutch C2, whereby the occurrence of an excessive downshift can be suppressed in the case where the first clutch C1 on-fails at the time when the seventh speed is established.

Other Embodiments

Incidentally, the embodiment of the invention disclosed herein is an exemplification in all respects, and does not constitute a basis for any limited interpretation. Accordingly, the technical scope of the invention is not construed by the foregoing embodiment of the invention alone, but is defined by what is described in the claims. Besides, the technical scope of the invention includes all modifications that are equivalent in significance and scope to the claims.

For example, in this embodiment of the invention, the example in which the invention is applied to the control apparatus 10 for the automatic transmission that is provided in the FF vehicle 100 is presented. However, the invention is not limited to this example, but is also applicable to a control apparatus for an automatic transmission that is provided in an FR vehicle or a 4WD vehicle.

Besides, in this embodiment of the invention, the example in which one of the first to eighth speeds is established at the time of the drive range is presented. However, the invention is not limited to this example, and any number of shift speeds may be provided.

What is claimed is:

1. A control apparatus for an automatic transmission, wherein
the automatic transmission is provided with a first frictional engagement element, a second frictional engagement element, and a third frictional engagement element, the automatic transmission is configured to establish a first shift speed by engagement of the first frictional engagement element and the second frictional engagement element, and the automatic transmission is configured to establish a second shift speed having a larger speed ratio than a speed ratio of the first shift speed, by engagement of the first frictional engagement element and the third frictional engagement element, the control apparatus comprising:

a controller that, during a period of the first shift speed, sets a first engagement pressure of the first frictional engagement element and a second engagement pressure of the second frictional engagement element such that a third torque capacity of the third frictional engagement element becomes smaller than a first torque capacity of the first frictional engagement element and a second torque capacity of the second frictional engagement element, when a third engagement pressure is generated in the third frictional engagement element.

2. The control apparatus according to claim 1, wherein each of the first frictional engagement element, the second frictional engagement element and third frictional engagement element is supplied with the first engagement pressure, the second engagement pressure and the third engagement pressure, respectively, each of the first engagement pressure, the second engagement pressure and the third engagement pressure is obtained by regulating a line pressure, and the line pressure is set higher than an oil pressure that is able to satisfy the first torque capacity, the second torque capacity and the third torque capacity required of each of the first frictional engagement element, the second frictional engagement element and third frictional engagement element, respectively.

3. A control apparatus for an automatic transmission, wherein the automatic transmission is provided with a fourth frictional engagement element, a fifth frictional engagement element, and a sixth frictional engagement element, the automatic transmission is configured to establish a third shift speed by engagement of the fourth frictional engagement element and the fifth frictional engagement element, and the automatic transmission is configured to establish a fourth shift speed having a smaller speed ratio than a speed ratio of the third shift speed, by engagement of the fourth frictional engagement element and the sixth frictional engagement element, the control apparatus comprising:

a controller that, during a period of the third shift speed, sets a fourth engagement pressure of the fourth frictional engagement element and a fifth engagement pressure of the fifth frictional engagement element such that a fifth torque capacity of the fifth frictional engagement element becomes smaller than a fourth torque capacity of the fourth frictional engagement element and a sixth torque capacity of the sixth frictional engagement element, when a sixth engagement pressure is generated in the sixth frictional engagement element.

4. The control apparatus according to claim 3, wherein each of the fourth frictional engagement element, the fifth frictional engagement element and the sixth frictional engagement element is supplied with the fourth engagement pressure, the fifth engagement pressure and the sixth engagement pressure, respectively, each of the fourth engagement pressure, the fifth engagement pressure and the sixth engagement pressure is obtained by regulating a line pressure, and the line pressure is set higher than an oil pressure that is able to satisfy the fourth torque capacity, the fifth torque capacity and the sixth torque capacity required of each of the fourth frictional engagement element, the fifth frictional engagement element and the sixth frictional engagement element, respectively.

* * * * *